US011421787B2

(12) United States Patent
McCoy et al.

(10) Patent No.: US 11,421,787 B2
(45) Date of Patent: *Aug. 23, 2022

(54) LABYRINTH SEAL BEARING HOUSING

(71) Applicant: Altria Client Services LLC, Richmond, VA (US)

(72) Inventors: Scott J. McCoy, North Prince George, VA (US); Frederick Scott Paschke, Henrico, VA (US); Eddie M. Tharrington, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,635

(22) Filed: Aug. 24, 2020

(65) Prior Publication Data
US 2020/0386319 A1 Dec. 10, 2020

Related U.S. Application Data

(63) Continuation of application No. 16/004,078, filed on Jun. 8, 2018, now Pat. No. 10,753,477, which is a continuation of application No. 14/640,967, filed on Mar. 6, 2015, now Pat. No. 10,006,548.

(60) Provisional application No. 61/953,563, filed on Mar. 14, 2014.

(51) Int. Cl.
*F16J 15/447* (2006.01)
*F16C 33/80* (2006.01)
*B01F 27/90* (2022.01)
*B01F 35/30* (2022.01)

(52) U.S. Cl.
CPC ............ *F16J 15/4472* (2013.01); *F16C 33/80* (2013.01); *B01F 27/90* (2022.01); *B01F 2035/351* (2022.01); *B01F 2035/3512* (2022.01)

(58) Field of Classification Search
CPC .... F16J 15/447; F16J 15/4472; F16J 15/4476; F16C 33/80; B01F 2015/00084; B01F 2015/00097; B01F 2035/351; B01F 2035/3512; B01F 27/90
See application file for complete search history.

(56) References Cited

U.S. PATENT DOCUMENTS 1,872,251 A 8/1932 Cowin
1,888,475 A 11/1932 Schmitz
1,978,739 A 10/1934 Brittain, Jr.
(Continued)

FOREIGN PATENT DOCUMENTS

DE 102006039983 A1 3/2008

*Primary Examiner* — Nicholas L Foster
(74) *Attorney, Agent, or Firm* — Harness, Dickey & Pierce, PL.C.

(57) ABSTRACT

Systems and methods for bearing housings are disclosed. A labyrinth seal bearing housing includes: a first seal element that is structured and arranged to be connected to a wall of a mixing vessel; a second seal element that is structured and arranged to be connected to a rotatable shaft; and a bearing support that is structured and arranged to be connected to the first seal element. The second seal element is configured to rotate relative to the first seal element and the bearing support. The first seal element and the second seal element are structured and arranged to create a tortuous flow path between an exterior and an interior of the mixing vessel.

17 Claims, 6 Drawing Sheets

(56) References Cited

U.S. PATENT DOCUMENTS

| | | | |
|---|---|---|---|
| 2,014,859 A * | 9/1935 | Mitchell, Jr. | F16C 33/80 384/480 |
| RE20,747 E * | 5/1938 | Simpson | B01F 23/60 277/420 |
| 2,583,671 A | 1/1952 | Schmitter | |
| 2,592,387 A | 4/1952 | Brown | |
| 2,627,171 A | 2/1953 | Brumagim | |
| 2,740,647 A | 4/1956 | Van Pelt | |
| 2,750,214 A | 6/1956 | Bermingham | |
| 2,919,962 A | 1/1960 | Hencken | |
| 2,938,661 A | 5/1960 | Ricketts | |
| 2,949,333 A | 8/1960 | Lesinski | |
| 3,245,663 A | 4/1966 | Austin | |
| 3,774,982 A | 11/1973 | Nakamura et al. | |
| 3,984,160 A * | 10/1976 | Sheldon | F16C 33/80 384/484 |
| 4,194,843 A | 3/1980 | Martin | |
| 4,209,178 A | 6/1980 | MacKenzie | |
| 5,261,528 A * | 11/1993 | Bouchal | B65G 39/09 384/480 |
| 5,433,308 A | 7/1995 | Gagnon | |
| 5,720,486 A | 2/1998 | Hutchings et al. | |
| 5,904,356 A | 5/1999 | Mundy | |
| 5,921,552 A | 7/1999 | Trackwell et al. | |
| 6,168,163 B1 | 1/2001 | Thorson et al. | |
| 6,247,702 B1 | 6/2001 | Long et al. | |
| 6,592,127 B1 | 7/2003 | Flower et al. | |
| 6,609,888 B1 | 8/2003 | Ingistov | |
| 6,966,746 B2 | 11/2005 | Cardenas et al. | |
| 8,356,941 B2 * | 1/2013 | Mason | F16C 33/7813 384/477 |
| 10,006,548 B2 | 6/2018 | McCoy et al. | |
| 10,753,477 B2 * | 8/2020 | McCoy | F16J 15/4474 |
| 2003/0035718 A1 | 2/2003 | Langston et al. | |
| 2016/0241102 A1 | 8/2016 | Graner et al. | |

\* cited by examiner

LABYRINTH SEAL BEARING HOUSING

CROSS-REFERENCE TO RELATED APPLICATIONS

This is a continuation application of U.S. application Ser. No. 16/004,078, filed Jun. 8, 2018, which is a continuation of U.S. application Ser. No. 14/640,967, filed Mar. 6, 2015, which claims priority to U.S. Provisional Application No. 61/953,563, filed Mar. 14, 2014, the entire contents of each of which are hereby incorporated by reference.

FIELD

This disclosure relates generally to seals for bearing housings and, more particularly, to seals for bearing housings used with rotating shafts in vessels.

SUMMARY

Mixing systems may include a rotatable shaft that extends within and without a mixing vessel. A driver is coupled to one end of the shaft outside the mixing vessel to supply a motive force for rotating the shaft. The driver may include, for example, a motor and a gearbox. A blade, paddle, or similar structure is coupled to another end of the shaft inside the mixing vessel to mix or stir the contents contained in the mixing vessel upon rotation of the shaft. The shaft is supported by a bearing where the shaft passes through a wall of the mixing vessel. A seal may be provided at the bearing to inhibit the unwanted entry of foreign material into the mixing vessel, such as oil and/or grease from the motor and/or gearbox that may run down the shaft and contaminate the contents contained in the mixing vessel. The seal may include a bushing or packing gland that the shaft rotates within, with the bushing or packing gland providing the sealing function around the shaft. However, over time this bushing or packing gland may degrade and/or disintegrate such that some or all of the bushing or packing gland falls into the mixing vessel and contaminates the contents contained in the mixing vessel.

In accordance with aspects disclosed herein there is a labyrinth seal bearing housing that includes: a first seal element that is structured and arranged to be connected to a wall of a mixing vessel; a second seal element that is structured and arranged to be connected to a rotatable shaft; and a bearing support that is structured and arranged to be connected to the first seal element. The second seal element is configured to rotate relative to the first seal element and the bearing support. The first seal element and the second seal element are structured and arranged to create a tortuous flow path between an exterior and an interior of the mixing vessel.

According to another aspect, there is a system that includes a rotatable shaft that is configured to extend inside of and outside of a mixing vessel. The system also includes: a first seal element that is structured and arranged to be connected to a wall of the mixing vessel; a second seal element connected to a rotatable shaft; and a bearing support connected to the first seal element. The second seal element is configured to rotate with the rotatable shaft relative to the first seal element, the bearing support, and the mixing vessel. The first seal element and the second seal element create a tortuous flow path between an exterior and an interior of the mixing vessel.

According to another aspect, there is a method including providing a labyrinth seal bearing housing. The labyrinth seal bearing housing includes: a first seal element comprising a first inner flange and a first outer flange; a second seal element comprising a lip seal, a second inner flange and a second outer flange; and a bearing support that is structured and arranged to hold a bearing and be connected to the first seal element. The second seal element is configured to rotate relative to the first seal element and the bearing support. The first inner flange, the first outer flange, the second inner flange, and the second outer flange are each circular and are structured and arranged to combine to create a tortuous flow path.

BRIEF DESCRIPTION OF THE DRAWINGS

Various aspects are further described in the detailed description which follows, in reference to the noted plurality of drawings by way of non-limiting examples of embodiments, in which like reference numerals represent similar parts throughout the several views of the drawings.

DETAILED DESCRIPTION

Figure 1:
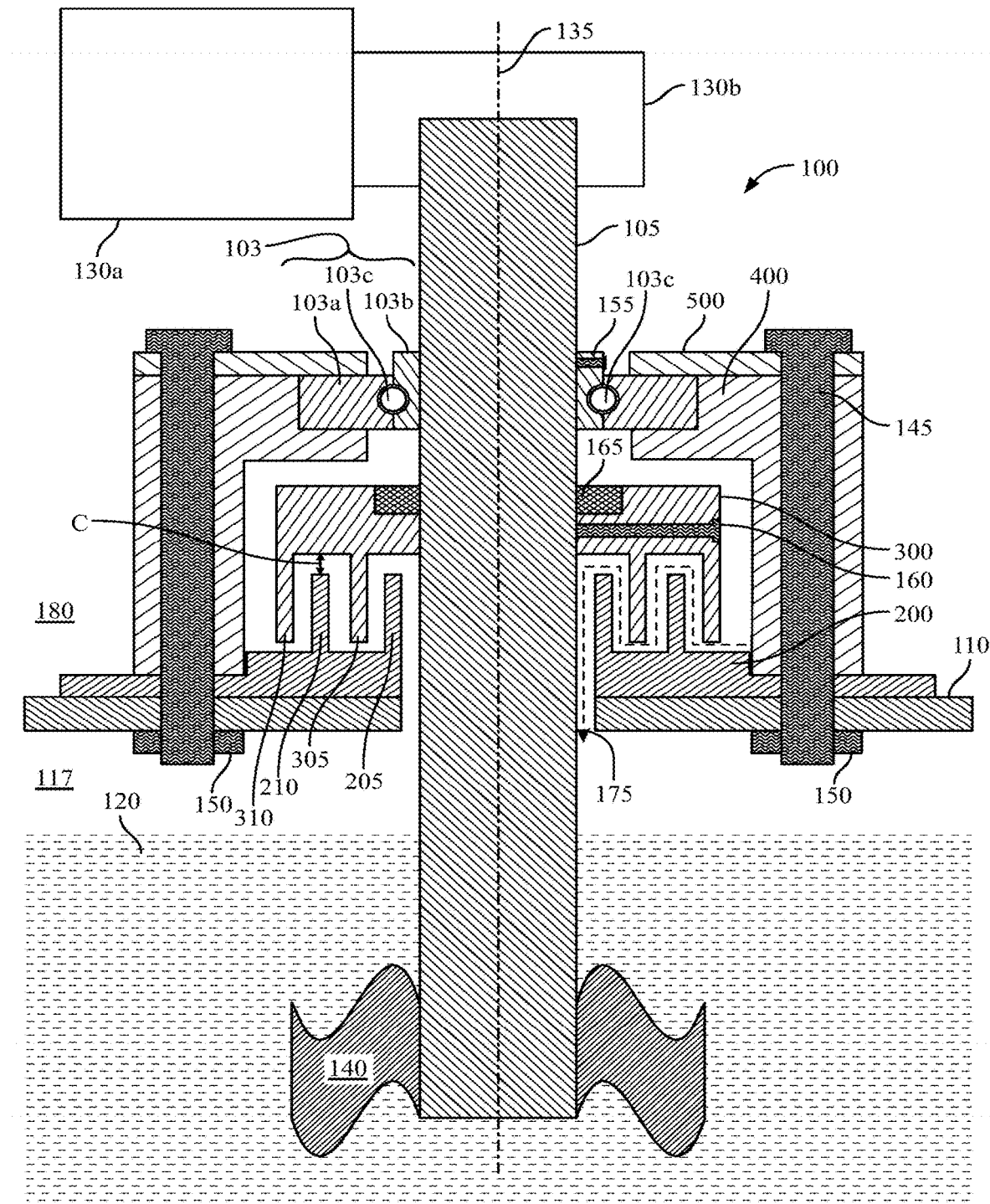
FIG. 1 shows an exemplary assembly of a labyrinth seal bearing housing in accordance herewith.

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms. Reference is now made to FIGS. 1-5, wherein like numerals are used to designate like elements throughout.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

FIG. 1 shows an exemplary assembly of a labyrinth seal bearing housing 100 in accordance herewith. In embodiments, the labyrinth seal bearing housing 100 includes a first seal element 200, a second seal element 300, a bearing support 400, and a cover 500. The bearing support 400 houses a bearing 103 that supports a rotatable shaft 105 that extends inside of and outside of a mixing vessel 110. As depicted in FIG. 1, the shaft 105 extends through an opening 115 in a wall of the mixing vessel 110 with clearance. The mixing vessel 110 may define an enclosed volume 117 in which contents 120 are contained for mixing, stirring, etc. The contents 120 may be any desired compound including, for example, liquids and/or solids. In a preferred embodiment, the contents 120 comprise a liquid-based flavor compound that may be used to provide flavor to tobacco products, such as smoking articles. However, the labyrinth seal bearing housing 100 is not limited to this implementation, and instead may be used with any desired contents 120.

A motor 130a may be connected to an end of the shaft 105 outside the mixing vessel 110 to provide a motive force for rotating the shaft 105 about an axis 135. The motor 130a may be any suitable motor, such as an electric motor, air-driven motor, internal combustion engine, etc. A gearbox 130b may optionally be connected between the motor 130a and the shaft 105. A blade 140, paddle, or similar structure may be coupled to another end of the shaft 105 inside the mixing vessel 110 to mix or stir the contents 120 upon rotation of the shaft 105 by the motor 130a. The shaft 105 may thus be an agitator shaft. The mixing vessel 110 may be any suitable walled vessel, such as a tank, container, drum, or the like.

With continued reference to FIG. 1, the labyrinth seal bearing housing 100 is assembled by fixedly connecting the first seal element 200, the bearing support 400, and the cover 500 to the mixing vessel 110, such that these elements are stationary relative to the mixing vessel 110 during rotation of the shaft 105. In embodiments, the first seal element 200, the bearing support 400, and the cover 500 are fixedly connected to the mixing vessel 110 by at least one fastener such as a threaded bolt 145 and nut 150, although any suitable fastener may be used. In a preferred embodiment, each of the first seal element 200, the bearing support 400, and the cover 500 has a plurality of holes. The labyrinth seal bearing housing 100 is structured and arranged such that the plurality of holes of the first seal element 200 aligns with the plurality of holes of each of the bearing support 400 and the cover 500. In this manner, a respective bolt 145 may be extended through each set of aligned holes, thereby fixing together the first seal element 200, the bearing support 400, and the cover 500. Corresponding holes may be formed in the wall of the mixing vessel 110, such that the bolts 145 also pass through these holes and fixedly connect the first seal element 200, the bearing support 400, and the cover 500 to the wall of the mixing chamber 110. Respective nuts 150 may be threaded to the ends of the respective bolts 145 and tightened to secure the connection.

As depicted in FIG. 1, the bearing support 400 holds the bearing 103 that supports the shaft 105 relative to the mixing vessel 110. In aspects described herein, the bearing 103 includes an outer race 103a that is fixedly connected to the bearing support 400, an inner race 103b that is fixedly connected to the shaft 105, and a series of ball bearings 103c between the bearing races. In embodiments, the outer race 103a is held in a seat of the bearing support 400 by friction fit, and the inner race 103b is fixed to the shaft 105 by one or more set screws 155. In this manner, the inner race 103b rotates with the shaft 105 relative to the outer race 103a and bearing support 400, which remain stationary during rotation of the shaft 105. As described in greater detail herein, the cover 500 and/or the bearing housing 400 may comprise a groove 540 (shown in FIG. 5) to provide access to the one or more set screws 155, e.g., for inserting and/or removing the one or more set screws 155. The bearing 103 may comprise any suitable type of bearing. In a preferred embodiment, the bearing 103 is a ceramic ball bearing to avoid spark hazards associated with flammable and/or volatile contents 120, although other types of bearing may be used.

Still referring to FIG. 1, the second seal element 300 is fixedly connected to the shaft 105 such that the second seal element 300 rotates with the shaft 105. The second seal element 300 may be connected to the shaft 105 by one or more set screws 160. In embodiments, the second seal element 300 has a central bore with a diameter that is sized for sliding contact along the outside diameter of the shaft 105, such that the second seal element 300 may be slid onto the shaft 105 via this central bore and held in place on the shaft 105 by the one or more set screws 160. In further embodiments, the second seal element 300 includes a seat that is sized to accommodate a lip seal 165 that encircles the shaft 105. The lip seal 165 may be constructed of a material and size such that it has a tighter fit to the shaft 105 than the second seal element 300 and, thus, provides a seal along the surface of the shaft 105 to prevent, e.g., oil and/or grease from traveling down the surface of the shaft 105 and into the contents 120 of the mixing vessel 110. In a preferred embodiment, the lip seal 165 is composed of polyether ether ketone (PEEK) plastic, although any suitable material may be used. The lip seal 165 may be friction fit to both the shaft 105 and within the seat of the second seal element 300. In this manner, the lip seal 165 and the second seal element 300 both directly contact and rotate with the shaft 105, while the first seal element 200, the bearing support 400, and the cover 500 do not directly contact the shaft 105.

As depicted in FIGS. 1 and 2a-c, the first seal element 200 includes an inner flange 205 and an outer flange 210. As depicted in FIGS. 1 and 3a-d, the second seal element 300 includes an inner flange 305 and an outer flange 310. When the labyrinth seal bearing housing 100 is assembled as shown in FIG. 1, the inner flange 305 of the second seal element 300 extends between the inner flange 205 and an outer flange 210 of the first seal element 200, and the outer flange 210 of the first seal element 200 extends between the inner flange 305 and the outer flange 310 of the second seal element 300. In this manner, the assembled labyrinth seal bearing housing 100 provides a labyrinth (e.g., tortuous) path 175 between the outside atmosphere 180 and the interior 117 of the mixing vessel 110. As depicted in FIG. 1, the path 175 may include seven changes of direction (e.g., 90° turns) in going from the outside atmosphere 180 to the interior 117 of the mixing vessel 110. The flanges 205, 210, 305, 310 may be structured and arranged such that the path 175 extends continuously from a first space between the second outer flange 310 and the first outer flange 210 to a second space between the first outer flange 210 and the second inner flange 305, and then continuously from the second space to a third space and between the second inner flange 305 and the first inner flange 205. The path 175 thus greatly inhibits, if not totally prevents, solid and/or liquid contaminants from traveling from the outside atmosphere 180 to the contents 120 contained at the interior 117 of the mixing vessel 110.

With continued reference to FIGS. 1, 2a-c, and 3a-d, in embodiments the flanges 205, 210, 305, 310 are circular flanges. In this manner, each of the flanges 205, 210, 305, 310 completely encircles the shaft 105. As should be apparent, the second seal element 300 forms an umbrella type seal that floats over the first seal element 200 when assembled as in FIG. 1, with the flanges 205, 210, 305, 310 arranged in an interdigitated arrangement when viewed in cross section. In embodiments, the clearance "C" between the tip of flange 310 and the body of the first seal element 200 is about 0.05 inches to about 0.20 inches, although any suitable amount of clearance may be used. A similar or different amount of clearance may be provided between the tip of flange 305 and the body of the first seal element 200. A similar or different amount of clearance may be provided between the tips of flanges 205 and 210 and the body of the second seal element 300.

Figure 2A:
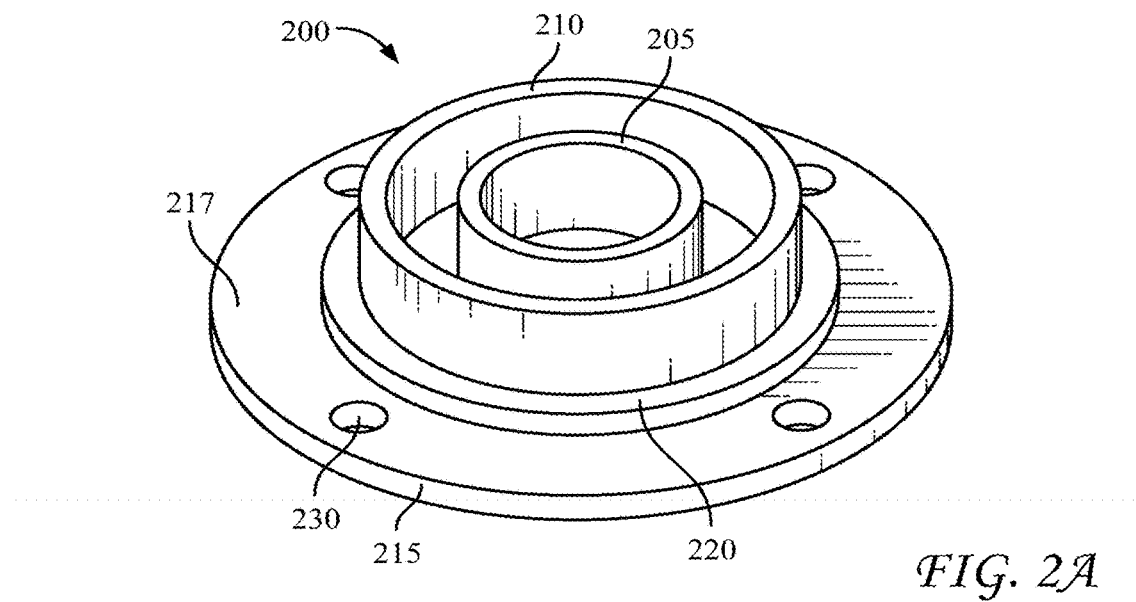
FIGS. 2*a-c* show aspects of a first seal element of the labyrinth seal bearing housing in accordance herewith.
Figure 2B:
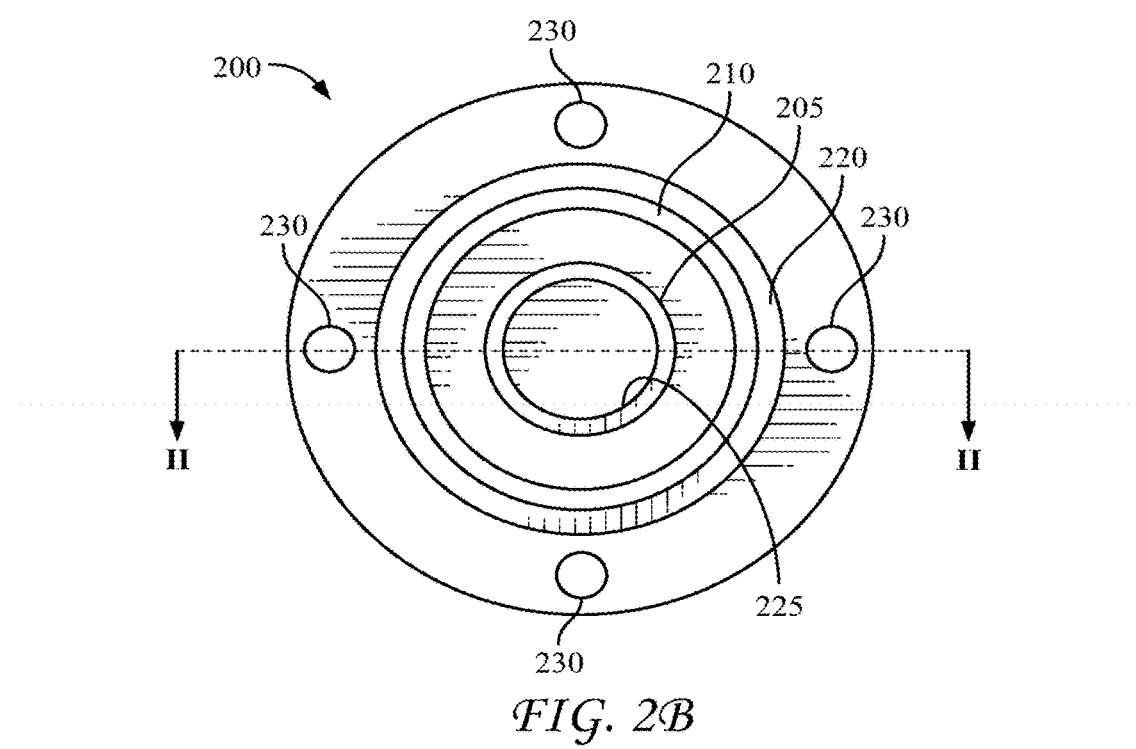
Figure 2C:
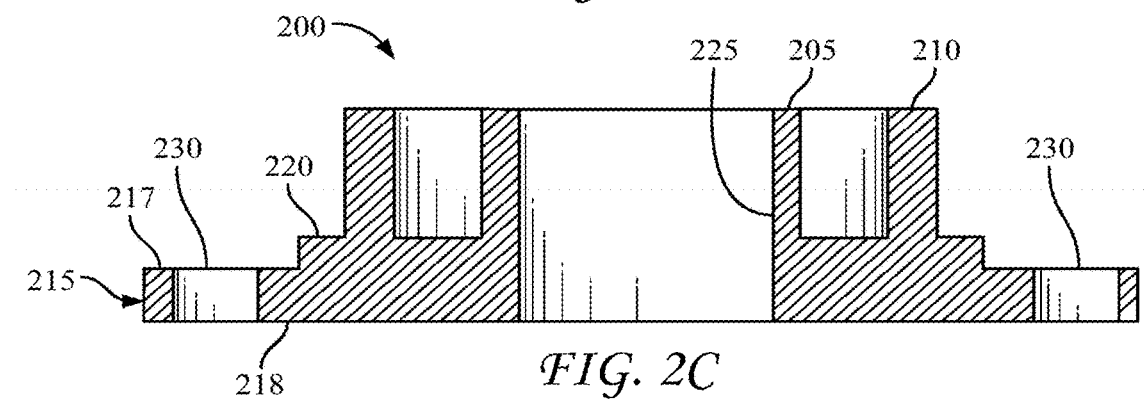

FIG. 2a shows an isometric view of the first seal element 200 in accordance herewith. FIG. 2b shows a plan view of the first seal element 200, and FIG. 2c shows a cross section along line II-II of FIG. 2b. The first seal element 200 includes a base 215 with a first surface 217 and a second surface 218. In embodiments, the first surface 217 is configured to contact and support a first post surface 455 of the bearing support 400 as described with respect to FIG. 4. The first seal element 200 may also include a shoulder 220 that is configured to contact a second post surface 460 of the bearing support 400 as described with respect to FIG. 4. In a preferred embodiment, the base 215 has a thickness between the first surface 217 and the second surface 218 of about 0.25 inches, although other thicknesses may be used. In the preferred embodiment, the base 215 is a circular plate with an outer diameter of about 5.19 inches, although other shapes and sizes may be used. In the preferred embodiment, the shoulder 220 has a top surface that is at a height of about 0.45 inches from the second surface 218, although other heights may be used.

In embodiments, the flanges 205 and 210 are circular flanges that extend outward from the base 215 and shoulder 220 on the same side of the base 215 as the shoulder 220. In the preferred embodiment, the flanges 205 and 210 each have a height of about 1.25 inches from the second surface 218, although other heights may be used. In the preferred embodiment, the flange 205 has an inner diameter of about 1.4 inches and an outer diameter of about 1.7 inches, and the flange 210 has an inner diameter of about 2.7 inches and an outer diameter of about 3.1 inches, although other diameters may be used.

The first seal element 200 also includes a central bore 225 that is sized to encircle the shaft 105 with clearance. In the preferred embodiment, the central bore 225 has an inner diameter of about 1.4 inches, i.e., the same as the inner diameter of the flange 205, although other diameters may be used.

The first seal element 200 may also include a plurality of holes 230. Any suitable number of holes 230 may be provided at any desired locations in the base 215. In the preferred embodiment, there are four holes each having a diameter of about 13/32 inch and equally spaced around the base 215, although other numbers and sizes of holes may be used.

Figure 3A:
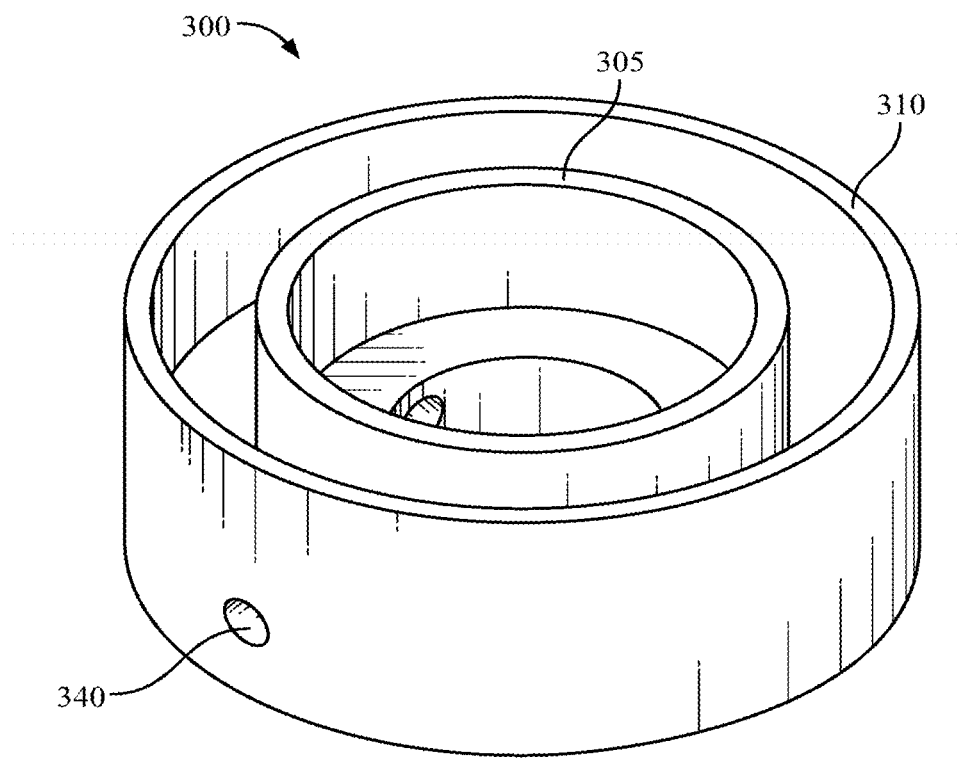
FIGS. 3*a-d* show aspects of a second seal element of the labyrinth seal bearing housing in accordance herewith.
Figure 3B:
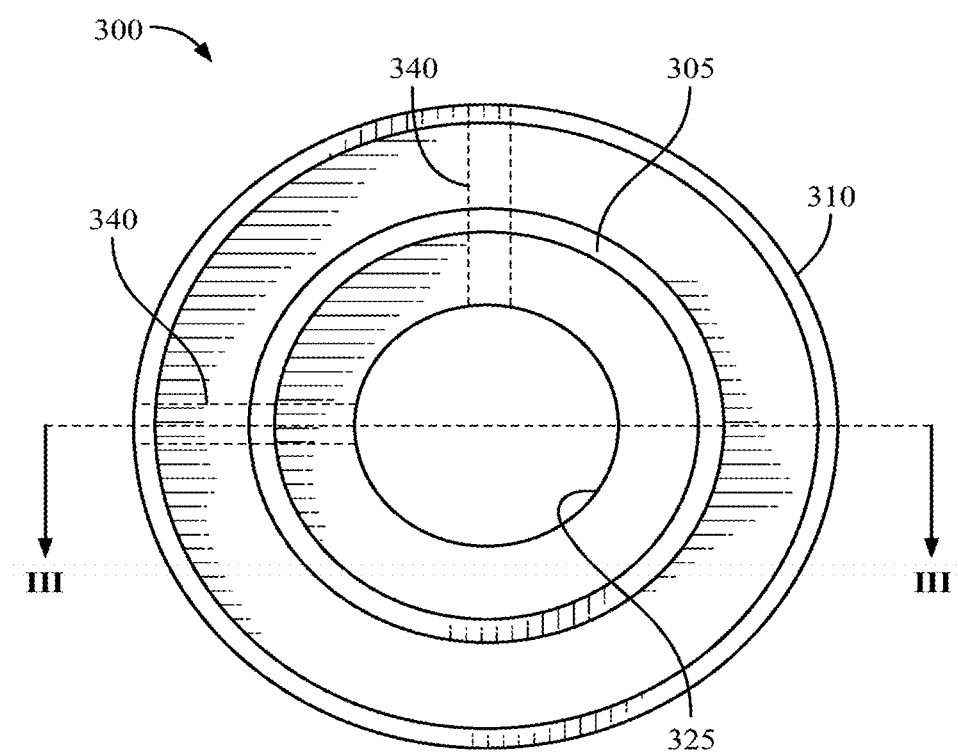
Figure 3C:
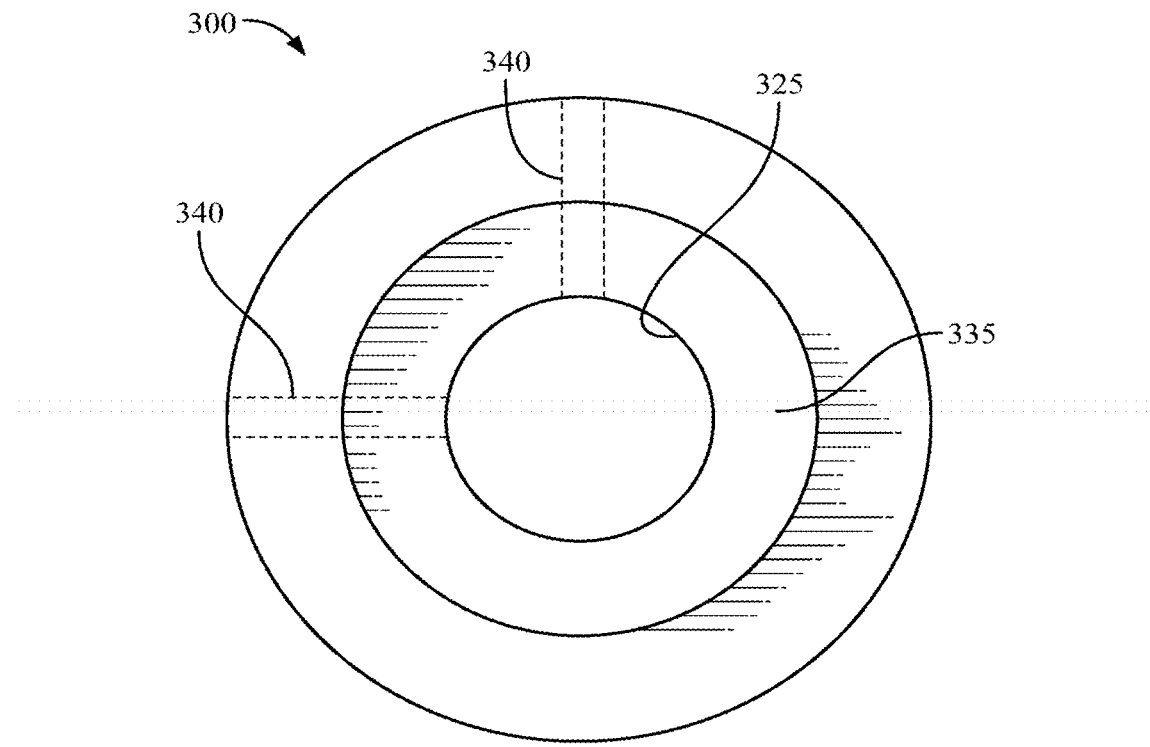
Figure 3D:
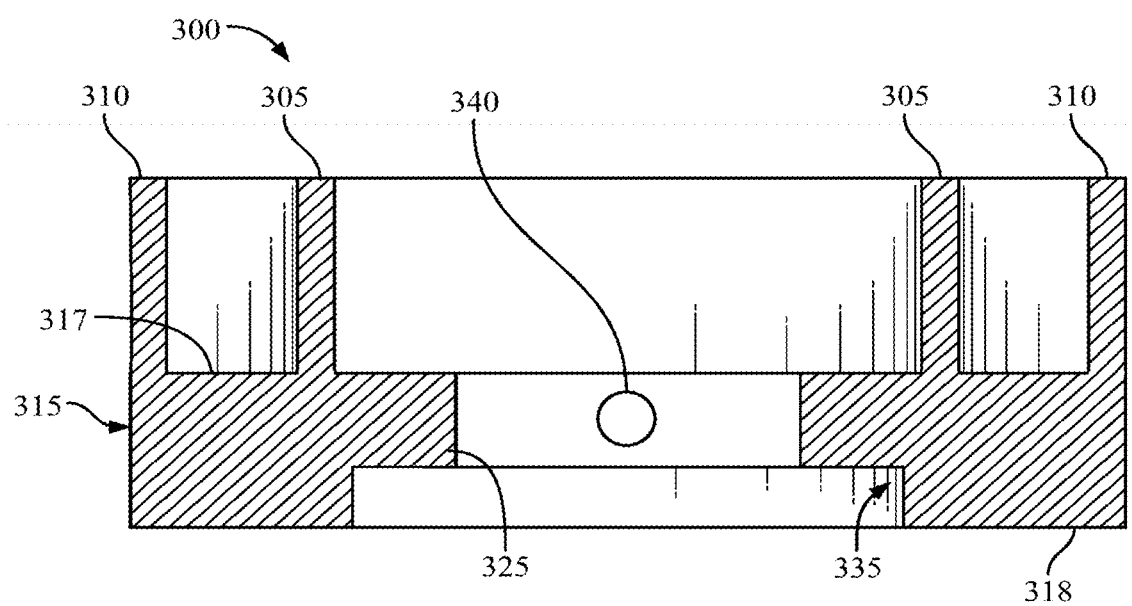

FIG. 3a shows an isometric view of the second seal element 300 in accordance herewith. FIG. 3b shows a plan view of the second seal element 300, FIG. 3c shows a bottom view of the second seal element 300, and FIG. 3d shows a cross section along line III-III of FIG. 3b. In embodiments, the second seal element 300 includes a body 315 having a first surface 317 and a second surface 318. In the preferred embodiment, the body 315 is circular with an outside diameter of about 3.45 inches and with a thickness between the first surface 317 and the second surface 318 of about 0.63 inches, although other sizes may be used.

In embodiments, the flanges 305 and 310 are circular flanges that extend outward from the first surface 317. In a preferred embodiment, the flanges 305 and 310 each have a height of about 1.375 inches from the bottom surface 318, although other heights may be used. In the preferred embodiment, the flange 305 has an inner diameter of about 2.1 inches and an outer diameter of about 2.3 inches, and the flange 310 has an inner diameter of about 3.25 inches and an outer diameter of about 3.45 inches, i.e., the same as the outer diameter of the body 315, although other diameters may be used.

The second seal element 300 also includes a central bore 325 that is sized to encircle the shaft 105. In the preferred embodiment the central bore 325 has an inner diameter of about 1.25 inches, although other diameters may be used, e.g., to match the diameter of the shaft 105.

Still referring to FIGS. 3a-d, the second seal element 300 may also include a recess 335 formed at the second surface 318, which recess 335 forms a seat for the lip seal 165 shown in FIG. 1. In the preferred embodiment the recess 335 has a depth of about 0.25 inches and a diameter of about 2.00 inches, although other sizes may be used, e.g., to correspond to the size of the lip seal 165.

With continued reference to FIGS. 3a-d, the second seal element 300 may also include at least one through bore 340. In embodiments, there are two bores 340 spaced 90° apart from one another, although any number of bores having any desired spacing may be used. In aspects, each bore 340 extends horizontally through the body 315 from an outside diameter surface of the body 315 to the central bore 325. Each bore 340 is sized to receive a set screw 160 (shown in FIG. 1) that fixes the second seal element 300 to the shaft 105. Each bore 340 may be threaded with threads that correspond to threads of the set screw 160. In the preferred embodiment, each bore 340 is a tap through 1/4-20 UNC, although other sizes may be used.

Figure 4A:
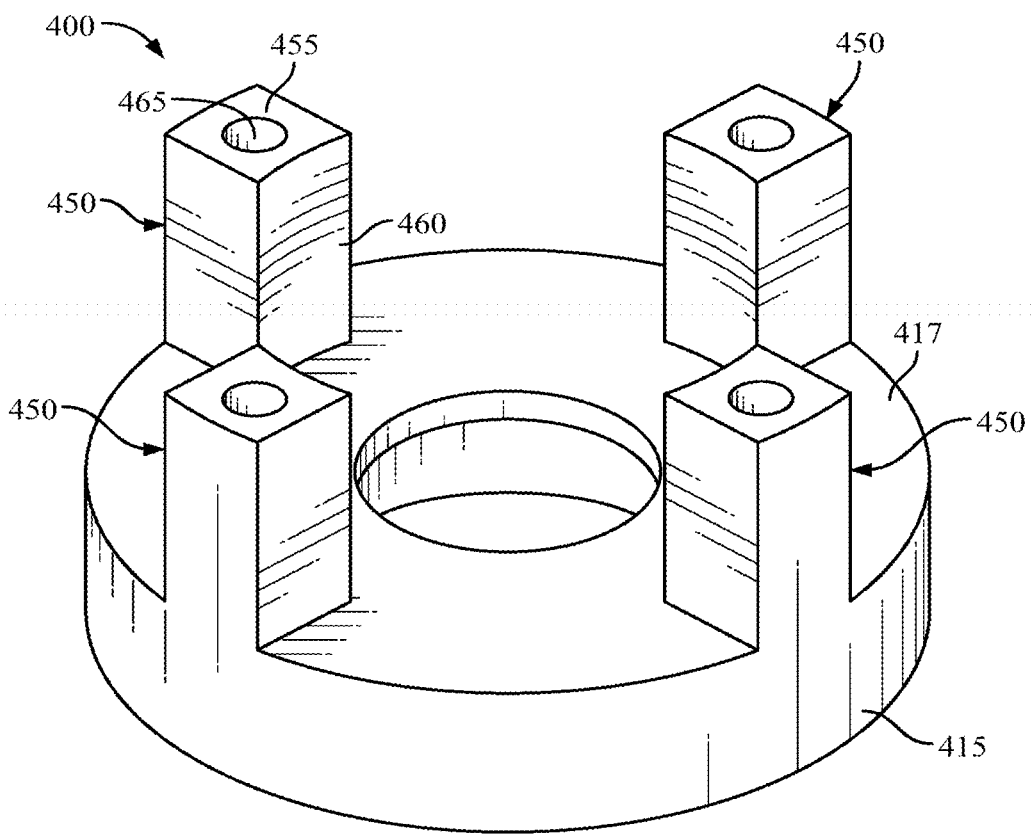
FIGS. 4*a-c* show aspects of a bearing support of the labyrinth seal bearing housing in accordance herewith.
Figure 4B:
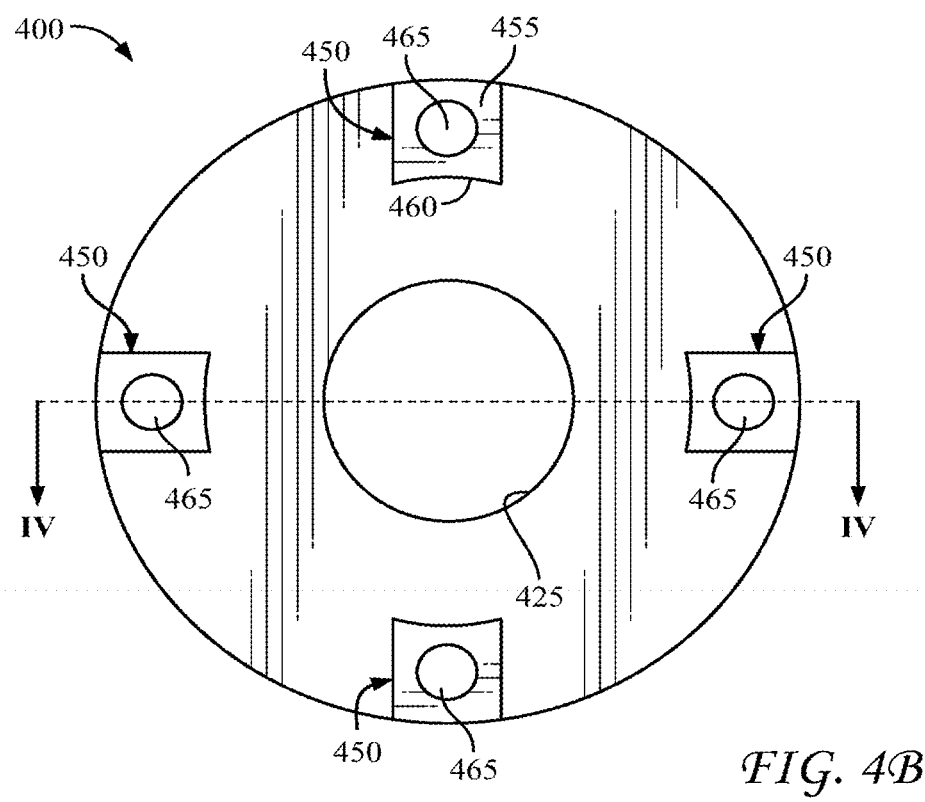
Figure 4C:
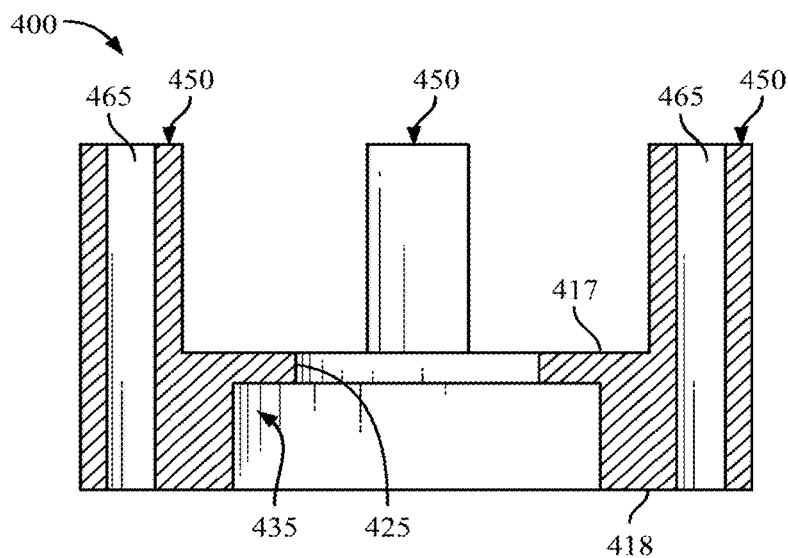

FIG. 4a shows an isometric view of the bearing support 400 in accordance herewith. FIG. 4b shows a plan view of the bearing support 400, and FIG. 4c shows a cross section along line IV-IV of FIG. 4b. In embodiments, the bearing support 400 includes a body 415 having a first surface 417 and a second surface 418. In the preferred embodiment, the body 415 is circular with an outside diameter of about 5.185 inches and with a thickness between the first surface 417 and the second surface 418 of about 1.175 inches, although other sizes may be used.

The bearing support 400 also includes a central bore 425 that is sized to encircle the shaft 105 with clearance. In the preferred embodiment, the central bore 425 has an inner diameter of about 1.895 inches, i.e., although other diameters may be used.

Still referring to FIGS. 4a-c, the bearing support 400 may also include a recess 435 formed at the second surface 418, which recess 435 forms a seat for the outer race 103a of the bearing 103 shown in FIG. 1. In the preferred embodiment the recess 435 has a depth of about 0.93 inches and a diameter of about 2.83 inches, although other sizes may be used, e.g., to correspond to the size of the bearing 103.

With continued reference to FIGS. 4a-c, in embodiments the bearing support 400 also includes a number of posts 450 extending outward from the first surface 417. In implementations, each post 450 has a first post surface 455 that is configured to contact the first surface 217 of the base 215 of the first seal element 200 (see FIGS. 2a-c) when the labyrinth seal bearing housing 100 is assembled as shown in FIG. 1. Each post 450 may also be provided with a second post surface 460 that is structured and arranged to contact the shoulder 220 of the first seal element 200 (see FIGS. 2a-c) when the labyrinth seal bearing housing 100 is assembled as shown in FIG. 1. In embodiments, the second post surface 460 is curved to correspond to (e.g., match) the curvature of the shoulder 220 to provide a snug fit between the post 450 and the shoulder 220. In the preferred embodiment, each post 450 has a height of about 1.725 inches above the first surface 417, although other heights may be used.

Referring again to FIGS. 4a-c, in embodiments each post 450 also includes a hole 465 that extends completely from the first post surface 455 to the second surface 418. In aspects described herein, the number and spacing of posts 450 equals the number and spacing of holes 230 in the first seal element 200. In this manner, the holes 465 are aligned with the holes 230 of the first seal element 200 when the labyrinth seal bearing housing 100 is assembled as shown in FIG. 1.

Figure 5A:
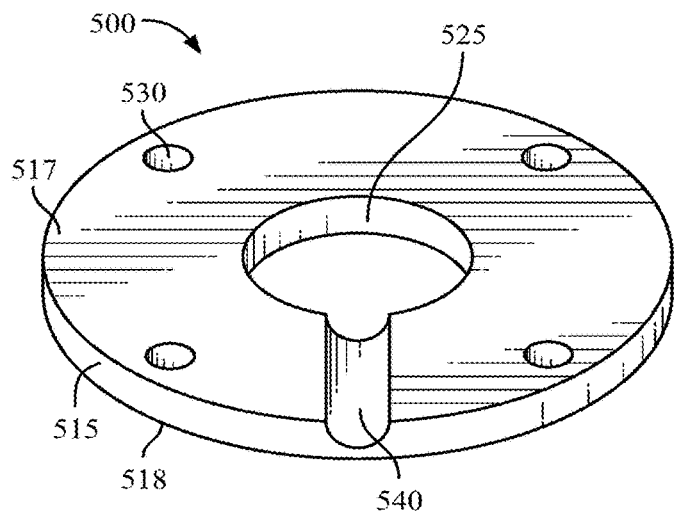
FIGS. 5*a-b* show aspects of a cover of the labyrinth seal bearing housing in accordance herewith.
Figure 5B:
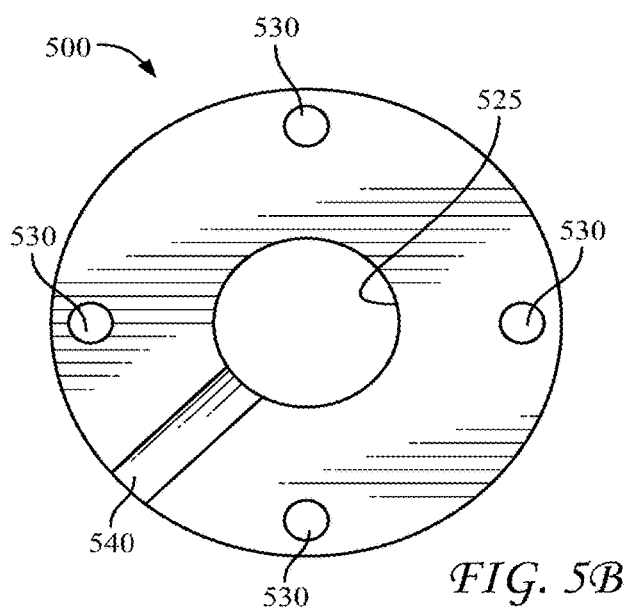

FIG. 5a shows an isometric view of the cover 500 in accordance herewith. FIG. 5b shows a plan view of the cover 500. In embodiments, the cover 500 includes a body 515 having a first surface 517 and a second surface 518. In the preferred embodiment, the body 515 is circular with an outside diameter of about 5.185 inches and with a thickness between the first surface 517 and the second surface 518 of about 0.4 inches, although other sizes may be used.

The cover 500 also includes a central bore 525 that is sized to encircle the shaft 105 with clearance. In the preferred embodiment the central bore 525 has an inner diameter of about 1.875 inches, although other diameters may be used.

Still referring to FIGS. 5a-b, in embodiments the cover 500 includes a plurality of holes 530, each of which extends completely from the first surface 517 to the second surface 518. In aspects described herein, the number and spacing of holes 530 equals the number and spacing of holes 230 in the first seal element 200. In this manner, the holes 530 are aligned with the holes 230 (and holes 465) with the when the labyrinth seal bearing housing 100 is assembled as shown in FIG. 1.

With continued reference to FIGS. 5a-b, in embodiments the cover 500 includes a groove 540 at the first surface 517. In embodiments, the groove 540 is a semi-circular groove that extends into the body 515 from the first surface 517. In the preferred embodiment, the groove has a radius of curvature of about 0.25 inches and a depth of about 0.25 inches, although other sizes may be used. In aspects described herein, the groove 540 is sized to provide access to one or more set screws 155 that hold the inner race 103b of bearing 103 to the shaft 105. In this labyrinth seal bearing housing 100 is structured and arranged such that the center of the groove 540 may be axially aligned with a set screw hole in the inner race 103b when the labyrinth seal bearing housing 100 is assembled as shown in FIG. 1.

The components of the labyrinth seal bearing housing 100 may be manufactured using any suitable materials. In a preferred embodiment, the first seal element 200, the second seal element 300, the bearing support 400, and the cover 500 are each composed of anodized aluminum, although other materials may be used.

As described herein, by utilizing the second seal element 300 and the lip seal 165 that rotate with the shaft, the labyrinth seal bearing housing 100 prevents contamination of contents inside a mixing vessel that might be generated from wear between a shaft and a seal that does not rotate with the shaft, such as a packing gland. Further, the tortuous path 175 provided by the first seal element 200 and the second seal element 300 prevents contamination from leakage of the bearing and/or gearbox and/or motor.

Implementations described herein include a method of manufacturing the labyrinth seal bearing housing 100. Implementations described herein include a method of installing the labyrinth seal bearing housing 100 on a shaft 105 and a mixing vessel 110.

The particulars shown herein are by way of example and for purposes of illustrative discussion only and are presented in the cause of providing what is believed to be the most useful and readily understood description of the principles and conceptual aspects. In this regard, no attempt is made to show structural details in more detail than is necessary for fundamental understanding, the description taken with the drawings making apparent to those skilled in the art how the several forms disclosed herein may be embodied in practice.

It is noted that the foregoing examples have been provided merely for the purpose of explanation and are in no way to be construed as limiting. While aspects have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects have been described herein with reference to particular means, materials, and/or embodiments, the present disclosure is not intended to be limited to the particulars disclosed herein; rather, it extends to all functionally equivalent structures, methods and uses, such as are within the scope of the appended claims.

The invention claimed is:
1. A labyrinth seal bearing housing, comprising:
a bearing support having a first end and a second end;

a first seal element covering the first end of the bearing support, the first seal element including a first annular inner flange and a first annular outer flange encircling a rotatable shaft;

a cover covering the second end of the bearing support;

a bearing for connection to the rotatable shaft, the bearing at least partially located in a circular recess in the second end of the bearing support and beneath said cover;

a second seal element that can be connected to the rotatable shaft, the second seal element located within the bearing support when the bearing and second seal are connected to the rotatable shaft, the second seal element including a second annular inner flange and a second annular outer flange encircling the rotatable shaft;

wherein the second annular inner flange extends between the first annular inner flange and the first annular outer flange;

wherein the first annular outer flange extends between the second annular inner flange and the second annular outer flange; and wherein the first seal element and the second seal element form a tortuous flow path between them when the bearing and second seal are connected to the rotatable shaft.

2. The labyrinth seal bearing housing of claim 1, wherein the first end of the bearing support comprises an end surface of a post.

3. The labyrinth seal bearing housing of claim 1, wherein the first end of the bearing support comprises end surfaces of a plurality of posts.

4. The labyrinth seal bearing housing of claim 1, wherein the bearing has as inner race and an outer race, and the outer race is seated in the circular recess of the bearing support.

5. The labyrinth seal bearing housing of claim 1, wherein the second seal element is configured to rotate relative to the first seal element and the bearing support.

6. The labyrinth seal bearing housing of claim 1, wherein the cover, the bearing support, the first seal element and the second seal element all have axially aligning central bores for accommodating the rotatable shaft.

7. The labyrinth seal bearing housing of claim 1, wherein the tortuous flow path extends continuously from a first space between the second annular outer flange and the first annular outer flange to a second space between the first annular outer flange and the second annular inner flange, and continuously from the second space to a third space between the second annular inner flange and the first annular inner flange.

8. The labyrinth seal bearing housing of claim 1, wherein the cover covers a portion of the bearing.

9. The labyrinth seal bearing housing of claim 1, wherein the second seal element comprises a first surface, a second surface, and a recess defined by the second surface, the recess configured to receive a lip seal.

10. The labyrinth seal bearing housing of claim 1, wherein the second seal element comprises a central bore configured to encircle the rotatable shaft and at least one through bore extending from an outside diameter of the second seal element to the central bore.

11. A system, comprising:

a rotatable shaft;

a bearing support having a first end and a second end;

a first seal element covering the first end of the bearing support, the first seal element including a first annular inner flange and a first annular outer flange encircling the rotatable shaft;

a cover covering the second end of the bearing support;

a bearing connected to the rotatable shaft, the bearing at least partially located in a circular recess in the second end of the bearing support and beneath said cover;

a second seal element connected to the rotatable shaft and located within the bearing support, the second seal element including a second annular inner flange and a second annular outer flange encircling the rotatable shaft;

wherein the second annular inner flange extends between the first annular inner flange and the first annular outer flange;

the first annular outer flange extends between the second annular inner flange and the second annular outer flange; and wherein the first seal element and the second seal element form a tortuous flow path between them.

12. The system of claim 11, wherein the first end of the bearing support comprises an end surface of a post.

13. The system of claim 11, wherein the first end of the bearing support comprises end surfaces of a plurality of posts.

14. The system of claim 11, wherein the bearing has an inner race and an outer race, the outer race is seated in the circular recess of the bearing support, and the inner race is connected to the shaft.

15. The system of claim 11, wherein the second seal element is configured to rotate relative to the first seal element and the bearing support.

16. The system of claim 11, wherein the cover, the bearing support, the first seal element and the second seal element all have axially aligning central bores for accommodating the rotatable shaft.

17. The system of claim 11, wherein the tortuous flow path extends continuously from a first space between the second annular outer flange and the first annular outer flange to a second space between the first annular outer flange and the second annular inner flange, and continuously from the second space to a third space between the second annular inner flange and the first annular inner flange.

* * * * *